Nov. 2, 1954 M. C. GAUTHIER 2,693,160
FIXTURE FOR USE IN ASSEMBLING AND HOLDING PARTS
Filed April 7, 1949

INVENTOR
M.C. GAUTHIER
BY
*W. E. Parnell*
ATTORNEY

United States Patent Office 2,693,160
Patented Nov. 2, 1954

2,693,160

FIXTURE FOR USE IN ASSEMBLING AND HOLDING PARTS

Marcel C. Gauthier, Montclair, N. J., assignor to Western Electric Company, Incorporated, New York, N. Y., a corporation of New York Application April 7, 1949, Serial No. 86,044

2 Claims. (Cl. 113—100)

This invention relates to fixtures for use in assembling parts and holding the parts in assembly while they are secured together, and more particularly to fixtures for use in assembling end parts in flanged open ends of U-shaped parts of metal containers and holding them in assembly while they are secured together by welding, soldering or other means.

In the communication arts, numerous electrical units are housed in metal containers which are of various sizes and contours depending upon the electrical units they are to house. Certain of these containers are formed of a suitable sheet metal including a main member U-shaped in general contour and having inwardly bent flanges at the open sides hereof which are to be closed by end parts secured to the flanges by suitable means such as welding or soldering. To accomplish the securing of the end parts to the flanges of the U-shaped part, it is necessary to assemble the parts in proper positions relative to each other and to firmly hold the parts in assembly while they are secured together.

An object of the invention is to provide a fixture which is simple in structure, readily actuable and highly efficient for use in assembling parts and holding the parts in assembly while they are secured together.

With this and other objects in view, the invention comprises a fixture including a main member formed to rest upon one of the parts and carrying a resilient element to support the other part and hold it in position relative to the main part while suitable means are actuated to clamp the parts in assembly.

More specifically the fixture includes a main member substantially T-shaped in general contour to rest at spaced positions upon the flanged open end of a U-shaped part whereby the resilient element cooperating with the main member will force the end part into intimate engagement with the flanges of the U-shaped part. A locating member carried by the main member is positioned to be engaged by the legs of the U-shaped part and to cooperate with clamping jaws, interposed between the main member and the locating member and pivotally supported thereby, to accurately locate the legs of the U-shaped part relative to the end part. Locating elements are interposed between the main member and the locating member to engage the outer edge of the end part at spaced positions to locate the end part accurately within the U-shaped part.

Other objects and advantages will be apparent from the following detailed description when considered in conjunction with the accompanying drawing, wherein Fig. 1 is a top plan view of the fixture shown in closed position, holding parts in assembly, a portion of the fixture being broken away;

Figure 4:
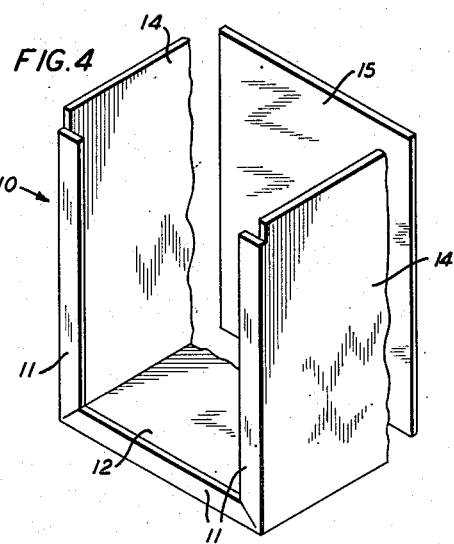
Fig. 4 is a fragmentary isometric view of parts to be assembled by the fixture.

Referring now to the drawing, attention is first directed to the parts shown in Fig. 4 which are to be assembled and held in assembly by the fixture. A main part 10 is U-shaped in general contour, formed of sheet material, preferably metal and having flanges 11 extending inwardly from the central and leg portions 12 and 14, respectively, of the member. Only one open end of the main member 10 is shown, the other end being identical therewith. Each end is to be closed by an end part 15 which is to be held firmly against the inner surfaces of the flanges 11 by the fixture.

The fixture for use in assembling the parts 10 and 15 and for holding the parts in assembly while they are secured together includes a main member 20 which is substantially T-shaped in general contour whereby its central portion 21 may rest upon the central flange 11 while the ends 22 may engage and rest upon the ends of the leg flanges 11. A locating member 23 is spaced from the main member 20 by locating elements 24 and secured to the main member with the locating elements by suitable means such as bolts 25 extending through the main member, the locating elements and the locating member. Cutaway portions in the ends of the locating member 23 provide surfaces 26 for engagement with the leg portions 14 of the U-shaped part 10 to accurately locate these portions relative to each other and the end part 15 in assembly.

Figure 1:
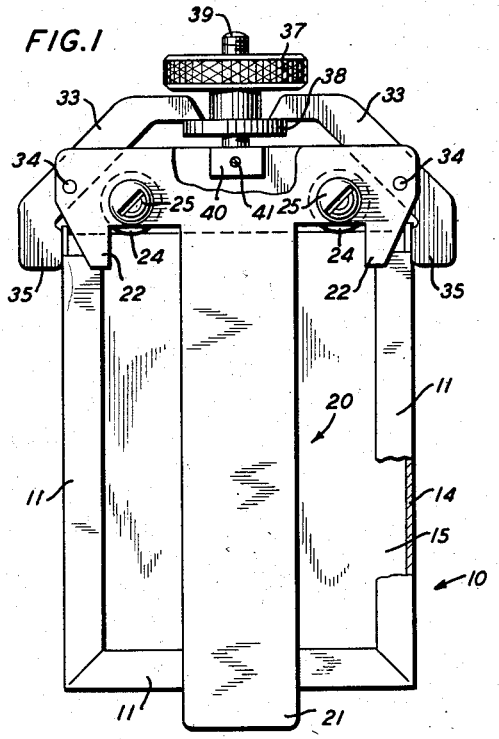
Figure 2:
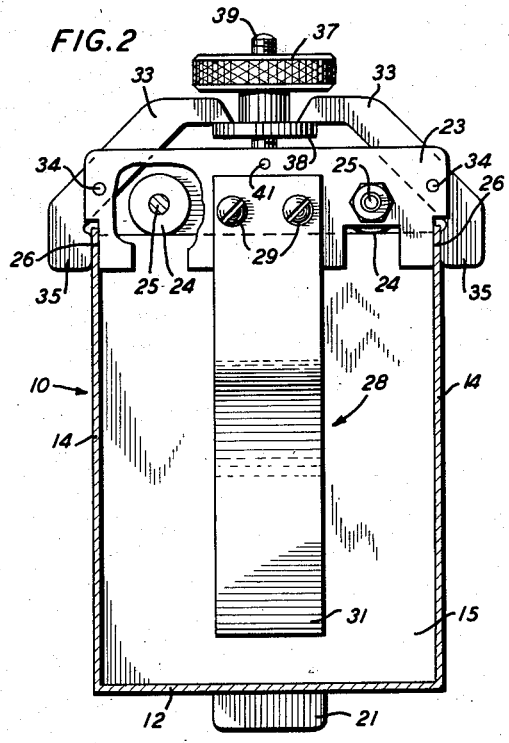
Fig. 2 is a bottom plan view of the fixture as shown in Fig. 1, a portion of the fixture being broken away.
Figure 3:
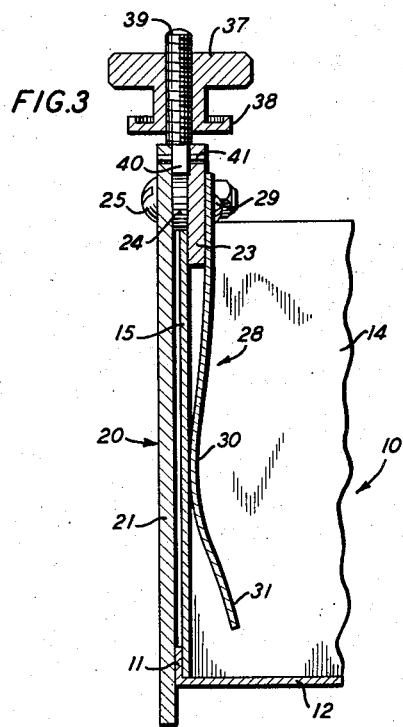
Fig. 3 is a longitudinal sectional view of the fixture shown in its holding position.

A resilient element 28 has its upper end secured at 29 to the locating member 23 and is bent inwardly at 30 (Fig. 3) to receive the end part 15 and force it first against the main member 20 and later against the flanges 11 while the part 15 is being assembled in the U-shaped part 10. The free end 31 of the resilient element 28 is bent outwardly away from the main member 20 to facilitate in the assembly of the end part 15 in the fixture.

Clamping jaws 33 are interposed between the main member 20 and the locating member 23 where they are supported by pivots 34 carried by these members. Like ends 35 of the clamping jaws 33 are positioned to engage the adjacent ends of the leg portions 14 of the U-shaped part 10 and force these portions against the locating surfaces 26 of the locating member 23. A hand wheel 37 has an annular portion 38 positioned to engage the outer ends of the clamping jaws 33 and cause relative movement of the clamping jaws into and out of clamping positions during rotation of the hand wheel on its threaded shaft 39. The threaded shaft 39 is integral with a block 40 which is interposed between the main member 20 and the locating member 23 and pivotally supported at 41.

During use of the fixture for assembling the end part 15 into the U-shaped part 10, the end part 15 is first placed in the fixture inserting the part between the resilient element 28 and the main member 20 until the leading edge of the part engages the locating elements 24. The fixture with the end part 15 is then moved relative to the U-shaped part whereby the end part 15 will be moved until the inner edge thereof engages the central portion of the U-shaped part. During this movement of the fixture relative to the U-shaped part, the leading end of the main member 20 is guided to rest upon the outer surface of flange 11 of the central member 12 and the ends 22 are guided to rest upon the outer surfaces of ends of the flanges 11 of the leg portions 14. When the fixture is located with the parts in this position, the operator may rotate the hand wheel 37 on its threaded shaft 39 to move the hand wheel outwardly, engaging the clamping jaws 33 and causing them to rotate simultaneously about their pivots 34 to move the end portions 35 into clamping engagement with the leg portions 14. This clamping engagement of the leg portions caused by the clamping jaws 33, particularly the portions 35 thereof, will cause firm clamping of the leg portions 14 between the clamping jaws and the surfaces 26 of the locating member 23. The parts 10 and 15, by the aid of the fixture, are therefore readily assembled, accurately positioned with respect to each other and firmly held in assembly while they are secured together either by welding the flanges 11 to the end part 15, soldering them together or securing them together by other suitable means.

The fixture may be readily removed from the assembled parts by rotating the hand wheel 37 to loosen the clamping jaws 33 after which the operator may move the fixture from the assembled parts, the fixture then being in readiness to assemble the other end part 15 to the flanges at the other open end of the U-shaped part 10.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for use in assembling an end part in a flanged open end of a U-shaped part and holding the parts in assembly while they are secured together, the fixture comprising a main member formed to rest on the outer surface of the flanged open end of the U-shaped part, a resilient element secured adjacent one end to the main member to support the end part and hold it in engagement with the inner surfaces of the flanges of the flanged open end of the U-shaped part, a locating member carried by the main member to be engaged by the leg portions of the U-shaped member, clamping jaws interposed between the main member and the locating member and pivotally supported thereby, and means to simultaneously actuate the clamping jaws causing the jaws to engage the leg portions of the U-shaped member and force them into intimate engagement with the locating member to position them accurately relative to the end part.

2. A fixture for use in assembling an end part in a flanged open end of a U-shaped part and holding the parts in assembly while they are secured together, the fixture comprising a main member adapted to engage spaced portions of and rest on the outer surface of the flanged open end of the U-shaped part, a locating member carried by the main member to be engaged by the leg portions of the U-shaped member, a resilient element having an end part engaging portion, means to secure the resilient element adjacent one end thereof to the locating member whereby the engaging portion thereof will hold the end part in engagement with the inner surfaces of the flanged open end of the U-shaped part by a force inherent in the resilient element, clamping jaws interposed between the main member and the locating member and pivotally supported thereby, and means to simultaneously actuate the clamping jaws to cause the jaws to engage the leg portions of the U-shaped member and force them into intimate engagement with the locating member to position them accurately relative to the end part.

References Cited in the file of this patent

UNITED STATES PATENTS

| Number | Name | Date |
|---|---|---|
| Re. 18,903 | Alvord | July 25, 1933 |
| 233,673 | Hamilton | Oct. 26, 1880 |
| 1,251,516 | Hardesty | Jan. 1, 1918 |
| 1,262,557 | Pittman | Apr. 9, 1918 |
| 1,270,043 | Murphy | June 18, 1918 |
| 1,642,548 | Jarecki | Sept. 13, 1927 |
| 1,813,545 | Reinhold | July 7, 1931 |
| 1,908,402 | Buchanan | May 9, 1933 |
| 2,005,146 | Kotrbaty | June 18, 1935 |
| 2,167,413 | Bartlett | June 25, 1939 |
| 2,202,096 | Dell | May 28, 1940 |
| 2,311,433 | Dershem | Feb. 16, 1943 |
| 2,452,985 | Bourdette | Nov. 2, 1948 |
| 2,467,103 | Webster | Apr. 12, 1949 |
| 2,481,081 | Celva | Sept. 6, 1949 |
| 2,575,412 | Fechter | Nov. 20, 1951 |